United States Patent
Nam (10) Patent No.: US 9,901,036 B2
(45) Date of Patent: Feb. 27, 2018

(54) VERSATILE ECO-FRIENDLY PLANTING BLOCK

(71) Applicant: FOUNDATION FOR RESEARCH AND BUSINESS, SEOUL NATIONAL UNIVERSITY OF SCIENCE AND TECHNOLOGY, Seoul (KR)

(72) Inventor: Jung-Min Nam, Seoul (KR)

(73) Assignee: Foundation for Research and Business, Seoul National University of Science and Technology, Seoul (KR)

( * ) Notice: Subject to any disclaimer, the term of this patent is extended or adjusted under 35 U.S.C. 154(b) by 134 days.

(21) Appl. No.: 14/809,647

(22) Filed: Jul. 27, 2015

(65) Prior Publication Data

US 2016/0029573 A1 Feb. 4, 2016

(30) Foreign Application Priority Data

Jul. 31, 2014 (KR) .................. 10-2014-0098201

(51) Int. Cl.
*A01G 9/02* (2006.01)
*A01G 9/10* (2006.01)
(52) U.S. Cl.
CPC .............. *A01G 9/02* (2013.01); *A01G 9/023* (2013.01); *A01G 9/10* (2013.01)
(58) Field of Classification Search
CPC ............. A01G 9/02; A01G 9/021; A01G 9/10
USPC ................. 47/65.5, 66.6, 73, 85, 86
See application file for complete search history.

(56) References Cited

U.S. PATENT DOCUMENTS

| | | | | |
|---|---|---|---|---|
| 4,006,558 A | * | 2/1977 | Neddo | A01G 9/104 206/423 |
| 4,118,892 A | * | 10/1978 | Nakamura | A01G 9/025 220/23.4 |
| 4,922,652 A | * | 5/1990 | Graves | A01G 13/0243 47/32.6 |
| 5,557,886 A | * | 9/1996 | Whitcomb | A01G 9/02 47/73 |
| 6,119,392 A | * | 9/2000 | Lais | A01G 13/0243 47/29.2 |
| 6,266,921 B1 | * | 7/2001 | Keskilohko | A01G 9/104 47/86 |

(Continued)

FOREIGN PATENT DOCUMENTS

| | | |
|---|---|---|
| KR | 10-2004-0016003 | 2/2004 |
| KR | 20-0397518 Y1 | 10/2005 |
| KR | 10-2011-0086276 | 7/2011 |

OTHER PUBLICATIONS

KIPO Office action dated Jul. 27, 2016, with English translation, for Korean priority Patent Application 10-2014-0098201 (11 pages).

(Continued)

*Primary Examiner* — David Parsley
(74) *Attorney, Agent, or Firm* — Lewis Roca Rothgerber Christie LLP (57) ABSTRACT

A versatile eco-friendly planting block includes: a block body in a form of a hexahedron; cut-off grooves formed at vertex parts of each surface of the block body in symmetrical to each other about a diagonal line of each surface of the block body; and a planting groove selectively formed in the cut-off groove so that vegetation is planted.

7 Claims, 6 Drawing Sheets (56) References Cited

U.S. PATENT DOCUMENTS

| | | | |
|---|---|---|---|
| 2005/0155287 A1* | 7/2005 | Phillips ................... | A01G 9/02 47/66.1 |
| 2008/0271371 A1* | 11/2008 | Weder .................... | A01G 9/026 47/66.4 |
| 2011/0252704 A1* | 10/2011 | Cho ....................... | A01G 9/025 47/66.6 |
| 2012/0174481 A1* | 7/2012 | Toro ........................ | A01G 9/02 47/86 |

OTHER PUBLICATIONS

KIPO Office action dated Jan. 5, 2016, with English translation, for Korean priority Patent Application 10-2014-0098201, (12 pages).

* cited by examiner

VERSATILE ECO-FRIENDLY PLANTING BLOCK

CROSS REFERENCE TO RELATED APPLICATION

This application claims the benefit of Korean Patent Application No. 10-2014-0098201, filed on Jul. 31, 2014, entitled "VERSATILE ECO-FRIENDLY PLANTING BLOCK", which is hereby incorporated by reference in its entirety into this application.

BACKGROUND OF THE INVENTION

1. Field of the Invention

The present invention relates to a versatile eco-friendly planting block, and more particularly, to a versatile eco-friendly planting block for artificially creating a natural ecosystem.

2. Description of the Related Art

Recently, eco-friendly planning, construction and management are required when building a structure with respect to 3-dimensional greening in urban areas, and, to this end, ecological parks, artificial wetlands, artificial greening, greening of elevation of structures and balconies and the like are being carried out.

Specifically, for greening the structures in the urban areas according to the present invention, rooftop greening, balcony greening, in which a flower bed is separately formed on a balcony in the case of structures such as apartments, and partial wall greening, in which a separate planting pot is installed on wall surfaces of structures, are developed, so various methods for satisfying efforts of residents to secure green areas due to lack of green areas in the urban area are being carried out under various legal supplementations. OK Specifically, methods of rooftop greening of structures are most actively carried out and is employed in various urban structures, and methods of forming a separate space for a separate greening space even at middle floors, not only the rooftop, are being propagated. However, because the rooftop greening is hardly externally exposed, the rooftop greening may be used as a resting area for residents, but has limits in being utilized as a greening scheme for the structure. In addition, cases in which the middle floors are made into a separate greening space also exist, however, because the shape of the structure needs to be transformed, the structure should be built taking this structure transformation into consideration from the inception of the design of the structure, thus, employing the middle floor greening to existing structures is impractical.

In addition, for the method of greening the wall surface of the structure, a method of forming blocks of various shapes and decorating a part of the wall surface of the structure by planting vegetation mostly in shrub forms in the planting pot is being utilized so that planting pots may be formed inside the blocks in a zig-zag form by a predetermined interval. However, this method is somewhat cumbersome for forming blocks, specifically, due to lack of management such as watering plants as time passes, in many cases, the plants wither, and the method may be effective for partial greening of a wall surface of the structure, however, the method has limitations in harmonious greening between an entire building and surrounding buildings.

In addition, in the case of structures such as apartments, a method of greening the structure by forming a separate simple flower bed allowing vegetation to be planted in the flower bed exist, however, in most cases, because the flower beds are formed in individual residential houses, the method has limitations in greening the exterior of the structure, and cannot function as a continuous greening scheme due to lack of management, and, specifically, greening cannot be performed on parts without openings such as side walls of apartments.

Accordingly, technological development of greening systems and methods in which greening on an external wall surface of a structure or in an urban area is more convenient and rapid greening is possible, methods of selecting appropriate species of vegetation and greening schemes of structures having various functions such as improving the appearance of the city, improving the emotional stability of residents, improving the durability of the structure, soundproofing and disaster prevention and the like through developments of criteria are required.

As related arts, there is Korean Unexamined Patent Publication No. 2004-0016003 entitled "System for greening structure wall surface and method of greening structure wall surface by using same."

SUMMARY OF THE INVENTION

The present invention provides a versatile eco-friendly planting block which can, individually, be used as six different shapes of flower beds according to a placement of the block, and can form an eco-friendly streetscape such as chairs, street benches through various combinations.

In addition, the present invention provides a versatile eco-friendly planting block which can improve the scenery of a 3-dimensional urban structure through greening of structures, and can be employed to artificial structures such as retaining walls, soundproofing walls, temporary earth retaining wall, display walls and the like.

In addition, the present invention provides a versatile eco-friendly planting block which can provide effects of controlling the weather of the urban area such as a mitigating urban heat island phenomenon by reducing radiant heat from the surface of the structure through greening of the structure, and can be helpful for reducing energy consumption through effects of insulation during winter time.

According to an embodiment, a planting block includes: a block body in a form of a hexahedron; cut-off grooves formed at vertex parts of each surface of the block body in symmetrical to each other about a diagonal line of each surface of the block body; and a planting groove selectively formed in the cut-off groove so that vegetation is planted.

According to an embodiment, the cut-off grooves facing each other about the diagonal line have mutually different shapes and depths.

According to an embodiment, the block body is formed with a drainage that communicates with the planting groove to discharge moisture in the planting groove to an outside.

According to an embodiment, the planting groove is formed therein with a drainage inclined surface inclined toward a drainage.

According to an embodiment, the block body is formed on each surface thereof with patterns having mutually different shapes and directionalities.

According to an embodiment, the patterns neighboring each other have a same interval and are configured in a form of a continuous pattern.

According to an embodiment, the block body is formed by an eco-friendly concrete material or a recycled plastic material.

According to the present invention, a block which improves the fragmentary external appearance and the function of a typical concrete block is provided. In other words, the functions of a concrete block and a flower bed are combined to provide a converging function which improves the single function of the concrete block or the flower bed.

Further, according to the present invention, the planting block can be used individually as the flower bed, and various functions such as a bench, partition wall and the like can be realized and the flower beds of various sizes can be configured according to the combination scheme, so that a small ecosystem which can be helpful for a pleasant indoor and outdoor environment can be developed.

In other words, a pleasant ecosystem environment for humans, animals and plants can be provided such as reduction in air pollution, reduction in noise and the like by the planted vegetation, and the planting block can be used individually or by combining multiple planting blocks so the greening area can be arbitrarily limited when needed.

DETAILED DESCRIPTION OF THE INVENTION

Hereinafter, the versatile eco-friendly planting block of the present invention is described with reference to the accompanying drawings.

Figure 1:
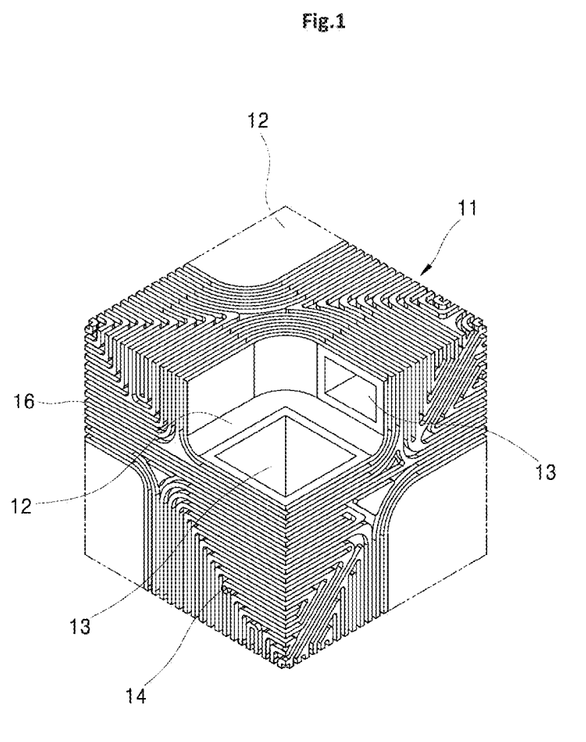
FIG. 1 is a perspective view showing an external appearance of a planting block of the present invention.
Figure 2:
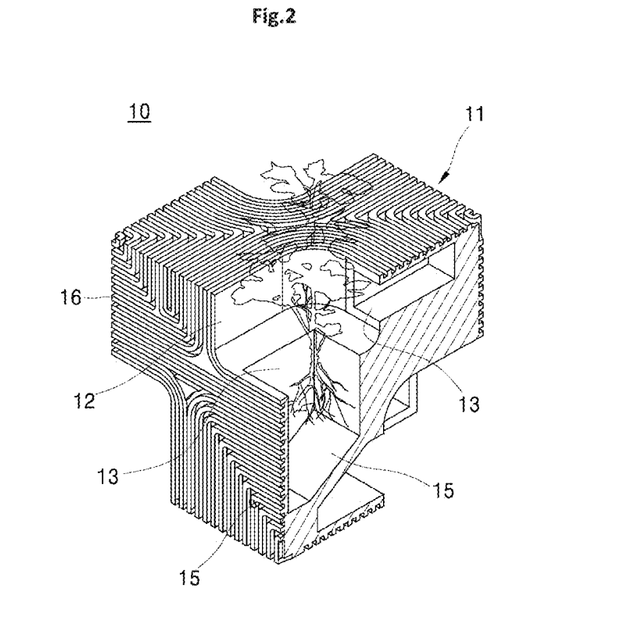
FIG. 2 is a cut-off perspective view showing the planting block according to FIG. 1.

FIG. 1 is a perspective view showing an external appearance of a planting block of the present invention, and FIG. 2 is a cut-off perspective view showing the planting block according to FIG. 1.

Referring to FIGS. 1 and 2, the versatile eco-friendly planting block 10 of the present invention includes a block body 11 in a form of a hexahedron. Specifically, the block body is preferably formed in a cube so that the planting blocks are compatible with each other when assembled.

The block body 11 plays the role of a plant box, and is preferably manufactured to include artificial soil and drainage inside thereof so that the planted vegetation may be continuously vegetated, and is manufactured by anti-corrosion and light-weight material, but the embodiment is not limited thereto.

In other words, the size and material may be changed according to the area of the wall surface of the structure and the size of the planting block. For example, the block body 11 maybe deposited and cured by an eco-friendly concrete material including recycled waste or formed by injection molding recycled plastic by taking the manufacturability of the block body into consideration.

The plant of the vegetation may be selected according to the usage of the structure in which the planting block is employed, external environments and location, and, specifically, because urban buildings are being built higher and the position of buildings are set to a certain direction (specifically, to the south), a type of the plant which has a certain condition of daylight, is less influenced from air pollution and is harmonious with surrounding green area should be selected. Naturally, similar conditions may be employed, in the case, for other structures.

The block body 11 of the present invention is in the form of a hexahedron, so the block body 11 has six surfaces. In each surface, a cut-off groove 12 is formed at a vertex of each surface of the block body in symmetrical to each other about a diagonal line of each surface of the block body. The two cut-off grooves 12, which face each other with respect to the diagonal line, may have identical shapes and depths, or may have different shapes and depths, however, for an overall diversification of the image when combined with other blocks, the cut-off grooves preferably have mutually different shapes and depths.

A planting groove 13 may be formed on at least one of the cut-off groove 12. The planting groove 31 is formed deeper from the cut-off groove 12 to one direction to form a foundation for the plant to grow.

A drainage 14, which communicates with the planting groove 13, is formed on the block body 11 so that moisture in the planting groove 13 is externally discharged, and a drainage inclined surface 15 is formed on at least one of the wall surface of the planting groove 13 and is inclined toward the drainage 14 by a predetermined angle. For example, the drainage 14 is formed through the block body 11 to correspond to a lower part of the planting groove 13, and the moisture running down the drainage inclined surface 15 is discharged along the drainage 14 to an outside. Meanwhile, because the angle of the drainage inclined surface 15 may be changed according to needs, the angle has no limitation.

A plurality of patterns 16 in a predetermined shape may be formed on an external surface of the block body 11. The pattern 16 may be formed on the block body 11 by a raised engraving or a depressed engraving, and the pattern 15 may be formed in mutually different shapes and directionalities on the six surfaces of the block body 11 so that a fragmentary external appearance of the block body 11 may be improved. However, the interval between patterns 16 is preferably constantly formed so that the continuity with the pattern 16 of an adjacent block body 11 may be implemented.

Figure 3:
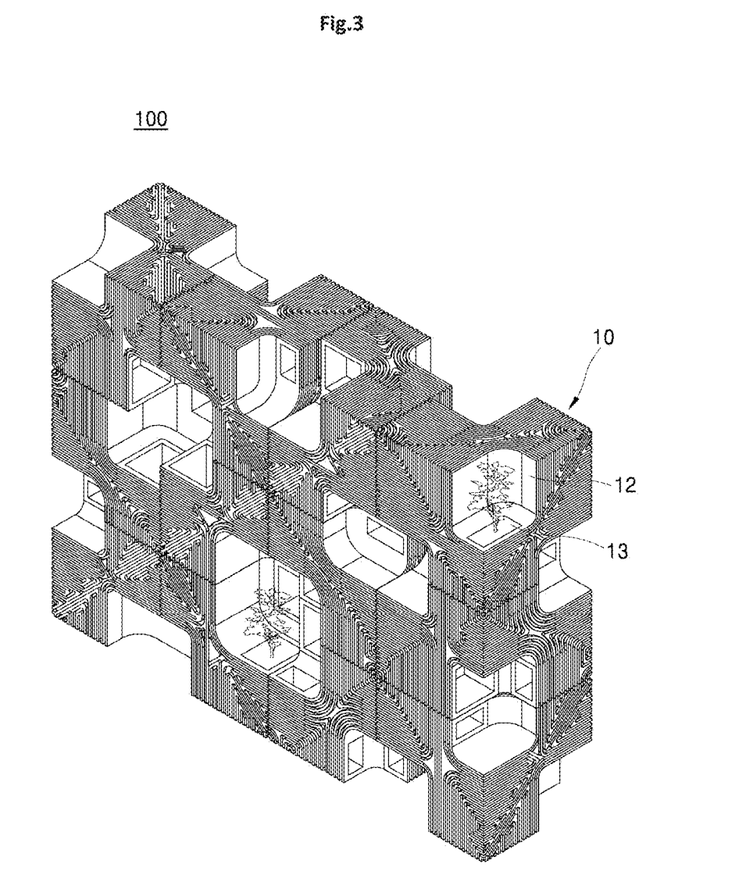
FIG. 3 is a perspective view showing multiple planting blocks of the present invention combined with each other.

FIG. 3 is a perspective view showing multiple planting blocks of the present invention combined with each other.

Referring to FIG. 3, in a planting block assembly 100, multiple planting block units 10 are vertically and longitudinally arranged next to each other.

Even though each of the planting block units 10 is not shown, the planting blocks are bonded by a bonding member such as an adhesive or may be fastened by a fastening unit such as a screw with the neighboring planting block. Otherwise, a concavo-convex shape may be formed on each planting block such that the blocks may be coupled to each other.

Multiple planting grooves 13 are exposed in various directions on the planting block assembly 100, which is constituted by multiple planting block units 10, and vegetation may be selectively planted in each planting groove 13.

Because multiple patterns are formed by an identical interval on each planting block, the patterns 16 are mutually coupled with the neighboring planting blocks, so, the continuity of the entire pattern 16 of the planting block assembly is ensured, thus, the harmony between the entire planting blocks may be implemented.

Therefore, an artificial ecosystem for a natural growth of plants is also created in the urban area to ensure a beneficial environment, and the fragmentary external appearance is improved by the connectivity of various patterns 16 so that an aesthetic sense may be provided to people.

Figure 4:
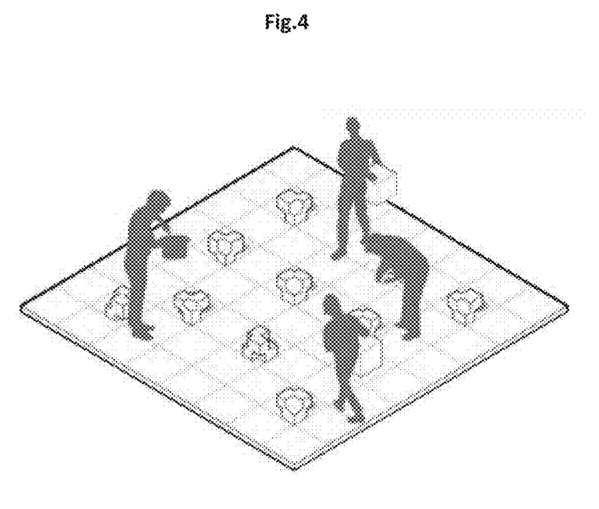
FIGS. 4 to 6 are views showing the planting blocks of the present invention in use.
Figure 5:
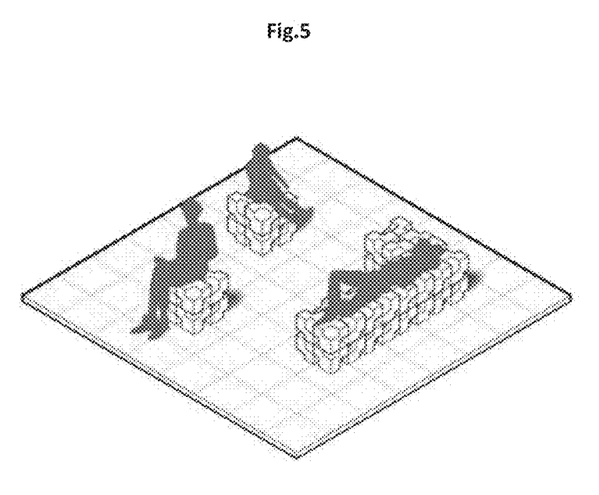
Figure 6:
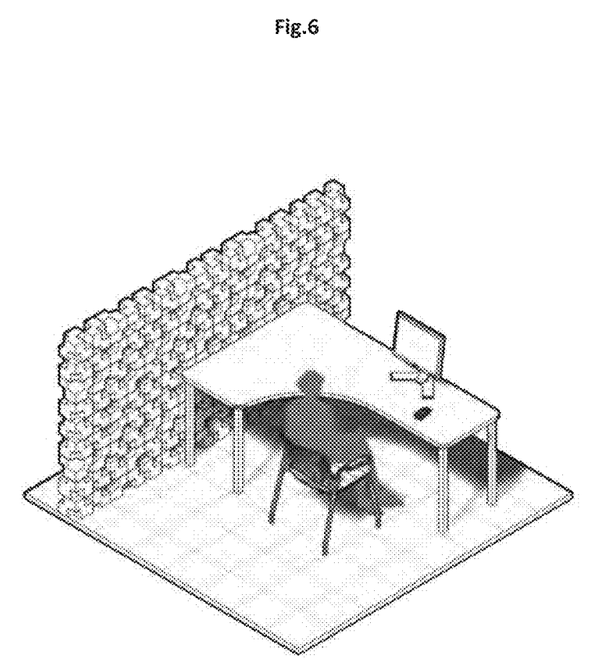

FIGS. 4 to 6 are views showing the planting blocks of the present invention in use.

The planting block decreases the radiant heat of a structure surface through greening of the structure such that effects of controlling the weather of the urban area such as mitigating urban heat island phenomenon is provided by reducing radiant heat of the the structure surface through greening of the structure, and may be helpful for reducing energy consumption through insulation during winter time.

In other words, a pleasant ecosystem environment for humans, animals and plants can be provided such as reduction is air pollution, reduction in noise and the like by the planted vegetation, and the planting block can be used individually or by combining multiple planting blocks, so the greening area can be arbitrarily limited when needed.

FIG. 4 shows each unit block individually arranged. In this case, each unit block takes the role of a flower bed.

In other words, the vegetation may be planted in at least one planting groove 13 formed on each unit block and the roots of the vegetation may be covered by soil. In this case, the vegetation may be planted on the side surface along with the top surface.

FIG. 5 shows multiple unit blocks combined to form a bench. The bench provides the function of typically allowing a person to sit in a park and the like. Normally, the bench may be configured by assembling a flat board and a support made of wood, however, the planting block of the present invention is in a hexahedron shape, so, when multiple planting blocks are combined to form an adequate height, the planting blocks may play the role of the bench on which a person may sit. In this case, flowers and the like may be selectively vegetated on the combined planting blocks, and the flowers and the like are preferably not vegetated on the top surface of the the upper most positioned planting block so that people may sit.

FIG. 6 shows multiple unit blocks combined to form a partition. Partitions are typically used in a form of a screen in offices and the like. The partition is normally manufactured by wood, synthetic resin and the like in a flat board form. However, in this case, overcoming the simplicity in the living space is difficult. When multiple planting blocks of the present invention are combined in a longitudinal direction and a vertical direction, the planting blocks may be used as the partition in the office and the like, and when flowers and the like are vegetated in the planting groove 13 within the planting block according to needs, an environment, in which the simplicity is improved, may be created.

What is claimed is:

1. A versatile eco-friendly planting block comprising:
    a block body in a form of a hexahedron;
    cut-off grooves formed at vertex parts of each surface of the block body in symmetrical to each other about a diagonal line of each surface of the block body, the cut-off grooves extending in three mutually orthogonal axial directions; and
    a plurality of planting grooves selectively formed in the cut-off grooves so that a vegetation may be planted,
    wherein plants are vegetated in each of the plurality of planting grooves,
    wherein the plurality of planting grooves extend in three mutually orthogonal axial directions, and
    wherein two of the cut-off grooves, which face each other with respect to the diagonal line of the respective surface of the block body, have different shapes and depths for an overall diversification of an appearance of a planting block assembly when the versatile eco-friendly planting block is combined with other planting blocks.

2. The versatile eco-friendly planting block of claim 1, wherein the block body is formed with a drainage that communicates with one planting groove of the plurality of planting grooves to discharge moisture in the one planting groove to an outside.

3. The versatile eco-friendly planting block of claim 1, wherein one planting groove of the plurality of planting grooves is formed therein with a drainage inclined surface inclined toward a drainage.

4. The versatile eco-friendly planting block of claim 1, wherein the block body is formed on each surface thereof with patterns having mutually different shapes and directionalities.

5. The versatile eco-friendly planting block of claim 4, wherein the patterns neighboring each other have a same interval and are configured in a form of a continuous pattern.

6. The versatile eco-friendly planting block of claim 1, wherein the block body is formed by an eco-friendly concrete material or a recycled plastic material.

7. A planting block assembly, comprising:
    a plurality of versatile eco-friendly planting blocks connected together in a longitudinal direction and a vertical direction to form a 3-dimensional arrangement, wherein each versatile eco-friendly planting block of the plurality of versatile eco-friendly planting blocks comprises:
        a block body in a form of a hexahedron;
        cut-off grooves formed at vertex parts of each surface of the block body in symmetrical to each other about a diagonal line of each surface of the block body, the cut-off grooves extending in three mutually orthogonal axial directions; and
        at least one planting groove selectively formed in at least one cut-off groove of the cut-off grooves so that a vegetation may be planted,
    wherein the at least one planting groove in each of the plurality of versatile eco-friendly planting blocks form a plurality of planting grooves of the planting block assembly,
    wherein the plurality of planting grooves of the planting block assembly extend in three mutually orthogonal axial directions,
    wherein the 3-dimensional arrangement comprises a partition wall,
    wherein plants are vegetated in each of the plurality of planting grooves within the planting block assembly, and
    wherein, for each versatile eco-friendly planting block of the plurality of versatile eco-friendly planting blocks, two of the cut-off grooves, which face each other with respect to the diagonal line of the respective surface of the block body, have different shapes and depths for an overall diversification of an appearance of the planting block assembly.

* * * * *